(12) United States Patent
Proctor

(10) Patent No.: US 6,426,964 B1
(45) Date of Patent: *Jul. 30, 2002

(54) TELECOMMUNICATIONS ACCESS SYSTEMS AND EQUIPMENT

(75) Inventor: Richard J Proctor, Wimbourne (GB)

(73) Assignee: Marconi Communications Limited, Coventry (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,260

(22) Filed: Nov. 14, 1997

(30) Foreign Application Priority Data

Nov. 21, 1996 (GB) ................................. 9624179

(51) Int. Cl.[7] .................................................. H04J 3/02
(52) U.S. Cl. ........................ 370/537; 370/522; 370/458
(58) Field of Search ................................. 370/538, 537, 370/535, 542, 543, 395, 394, 458, 471, 522, 355, 904, 540, 524, 352, 459, 476

(56) References Cited

U.S. PATENT DOCUMENTS

| 5,163,046 A | 11/1992 | Hahne et al. | |
| 5,214,643 A | 5/1993 | Mueller et al. | 370/466 |
| 5,247,518 A | 9/1993 | Takiyasu et al. | 370/466 |
| 5,251,204 A | 10/1993 | Izawa et al. | 370/249 |
| 5,568,486 A | 10/1996 | Huscroft et al. | 370/395 |
| 5,784,597 A | * 7/1998 | Chiu et al. | 395/552 |
| 5,793,760 A | * 8/1998 | Chopping | 370/355 |

FOREIGN PATENT DOCUMENTS

| EP | 0 528 370 A2 | 2/1993 |
| EP | 0 713 347 A3 | 5/1996 |
| WO | WO 94/03004 | 2/1994 |
| WO | WO 94/27387 | 11/1994 |

OTHER PUBLICATIONS

Basics of Theory of Radiotelemetry, "Energyia", Moscow, 1973, pp. 484–490, A. P. Monotsev. Translation included.

* cited by examiner

*Primary Examiner*—Douglas W. Olms
*Assistant Examiner*—Ricardo M. Pizarro
(74) *Attorney, Agent, or Firm*—Kirschstein, et al.

(57) ABSTRACT

A higher data rate signal such as ATM (Asinchronous Transfer Mode) fixed size data packets and lower data rate signals such as ISDN are transmitted along the same link by accommodating the ISDN in unused time slots in the overall frame structure. The cells also contain a fiel containing incremented numbers of modulo-n and, in the reverse direction along the link, frames are transmitted which acknowledge receipt of those sequence numbers. If the next expected number is not received, the sequence transmitted is restarted at the number.

24 Claims, 3 Drawing Sheets

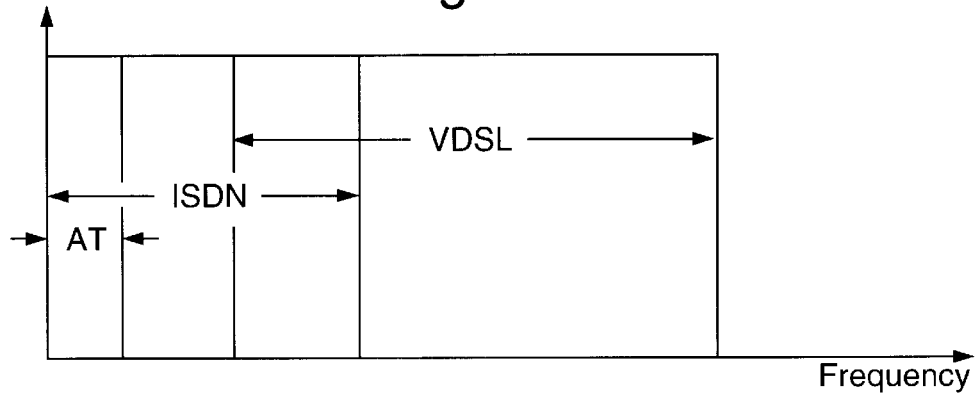
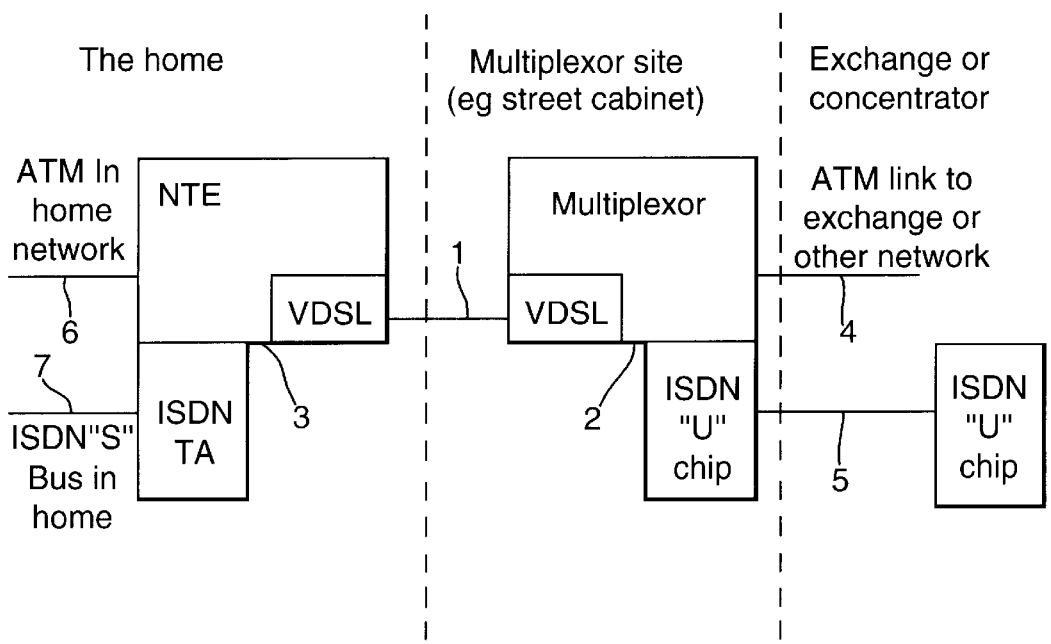

TELECOMMUNICATIONS ACCESS SYSTEMS AND EQUIPMENT

BACKGROUND OF THE INVENTION

This invention relates to telecommunications access systems and equipment.

Systems for carrying data at increased rates are being developed, and offer the chance to extend the range of services which customers can access using the terminal in their homes. Thus, while existing terminals can handle services according to the ISDN specification such as facsimile transmission or computer communication in addition to speech, higher data rates would offer the chance to transmit television signals into the user terminal as well as to permit interactive viewing.

A problem arises as to how to combine the higher data rate services such as ATM (Asynchronous Transfer Mode) with the existing lower data rate services such as ISDN services. In ATM, information is contained in fixed sized data packets known as cells, typically 53 byte long, which are long enough for data but short enough for delay sensitive devices (ITU Recommendations I-150).

Among the access methods being developed for high speed data transfer for terminal users are VDSL (Very High Speed Digital Asymmetrical Subscriber Line), HDSL (High Speed Digital Subscriber Line) and ADSL (Asymmetric Digital Subscriber Line). ADSL is described in ANSI Reference T1.413.

Typically, VDSL could operate with a data rate of up to 25 Mbit/sec in one direction and 3 Mbit/sec in the other direction. Typically, HDSL has data rates up to 2 Mbit/sec in each direction and ADSL has rates up to 6 Mbit/sec in one direction, and a few 100 kbit/sec in the other direction. Compared to this, basic rate ISDN is generated typically at 144 kbit/sec.

The applicants considered combining the ATM and the ISDN elements in several ways.

Referring to FIG. 1, the bandwidth occupied by analogue telephony is as indicated by "AT" and the bandwidth for ISDN is indicated "ISDN". The applicants considered transmitting the VSDL signal at higher frequencies than the ISDN, i.e. not as shown in FIG. 1. The problem with this is that ISDN uses up spectrum fairly inefficiently compared to VDSL using Discrete Multi-Tone Modulation (DMT) or Carrierless Amplitude and Phase (CAP) and, if the VDSL signal were to be carried at higher frequencies, inherent restrictions as to the highest frequency which can be carried by a communication link (in particular a copper wire pair) require that the bandwidth available for VSDL would have to be restricted from the bandwidth shown in FIG. 1, reducing the capability of carrying VDSL from 25 to perhaps 12 Mbit/sec.

The applicants also considered dedicating one or more of the number of discrete carriers generated by digital multiplexed equipment (normally used to deliver one large channel) specifically for carrying the ISDN, leaving the rest to carry the ATM. However, the two elements are very separate, and an evolution later whereby both ISDN and ATM material would come from the same source, e.g. link 4, would become relatively complex.

The applicants also contemplated arranging the ISDN data in the form of the same data packets as ATM uses and then transmitting the information in this way. However, the latency of the packetization is high which would mean that the ISDN link would no longer conform to requirements.

SUMMARY OF THE INVENTION

This invention provides a method of delivering a higher data rate signal representing first services and a lower data rate signal representing second services along the same link, comprising the steps of receiving the separate signals from a communications network, and transmitting along the link the higher data rate signal in fixed size data packets within frames, the lower data rate signals being accommodated in time slots in the frames not occupied by the fixed size data packets.

The invention also provides a multiplexer for delivering a higher data rate signal representing first services and a lower data rate signal representing second services along the same link, comprising ports for reception from a communication network of the separate signals, and means for transmitting along the link the higher data rate signal in fixed size data packets within frames, the lower data rate signal being accommodated in time slots in the frames not occupied by the fixed size data packets.

The invention also provides network terminating equipment for receiving a higher data rate signal representing first services and a lower data rate signal representing second services along the same link from a multiplexer, comprising means for receiving from the link the higher data rate signals in fixed size data packets within frames, the lower data rate signal being accommodated in time slots in the frames not occupied by the fixed size data packets, and means for extracting the first services and the second services.

The invention avoids the disadvantages noted above. The lower data rate signal, e.g. ISDN, does not suffer from much delay, and it is possible for the system to be designed so that it can migrate later when the lower data rate signal, e.g. ISDN and the higher data rate signal, e.g. ATM come from the same source.

The time slots which accommodate the lower data rate signal may be part of a data packet containing a synchronization pattern, i.e. a framing data packet.

Advantageously the data packets transmitted across the link include a field containing a number which changes from packet to packet in a regularly repeating sequence, the receipt of the packet number in the sequence being acknowledged. The system may be such that, in the event that the next packet in the sequence is not received across the link, the sequence being transmitted is restarted at that next packet.

BRIEF DESCRIPTION OF THE DRAWINGS

Telecommunications access systems and equipment, including a multiplexer and network terminating equipment, constructed in accordance with the invention, will now be described, by way of example, with reference to the accompanying drawings in which:

FIG. 1 is a schematic diagram to show the regions of the frequency spectrum occupied by various signals down the link;

FIG. 2 shows the connection of the multiplexer and the network terminating equipment in normal operating conditions;

DESCRIPTION OF THE PREFERRED EMBODIMENTS

Figure 3:
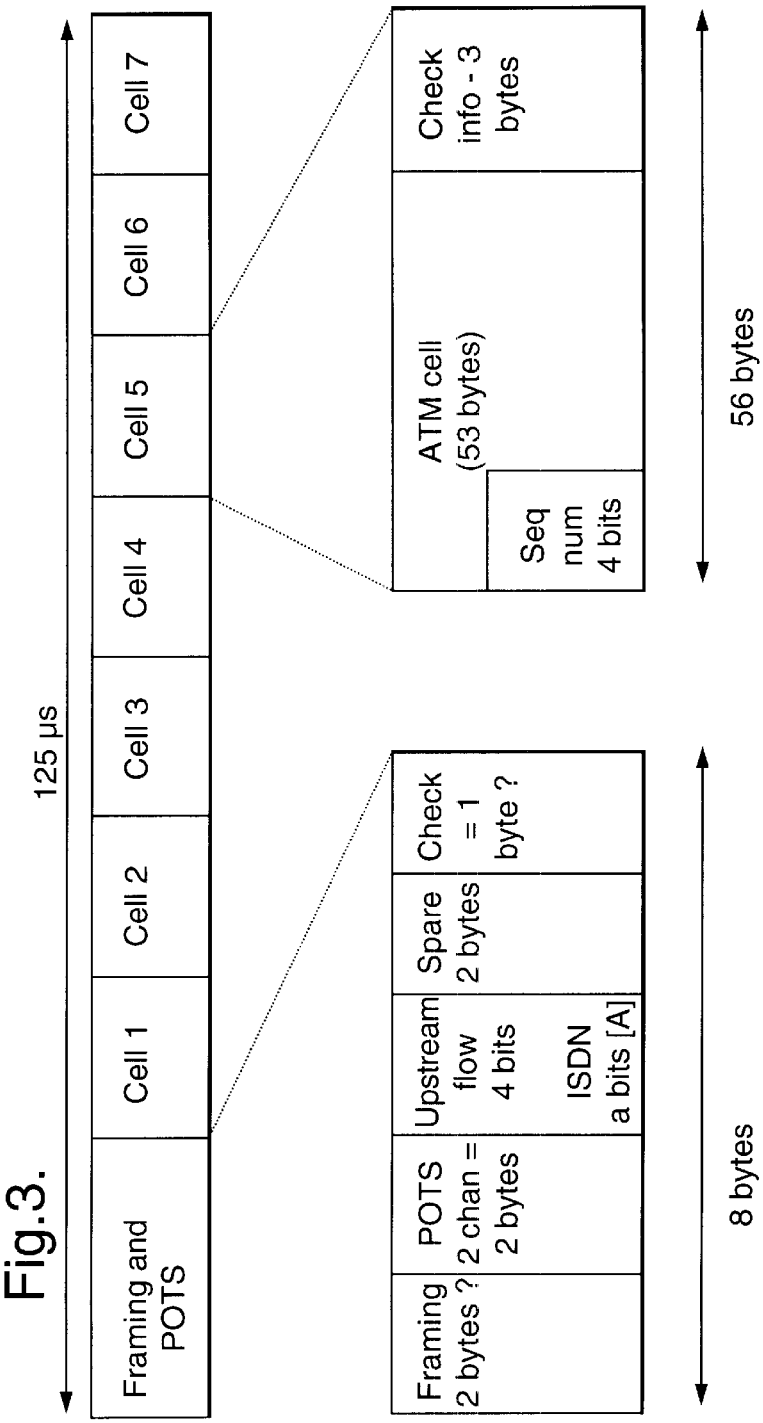
FIG. 3 illustrates a frame sent out by the multiplexer to the network terminating equipment.

Referring to FIG. 2 a simple copper wire pair 1 links a multiplexer 2 in a street cabinet with network terminating equipment 3 in a home. In turn the multiplexer 2 in the street cabinet is linked to a local exchange or to a concentrator firstly by means of an optical fibre connection 4 and secondly by means of a copper wire pair 5.

The optical fibre 4 carries ATM (Asynchronous Transfer Mode). Typically, the ATM data is be clocked at 155 Mbit/sec upwards. The copper wire pair 5 carries ISDN which is typically clocked at 144 kbit/sec. It follows that both links 4 and 5 can be relatively long, say, up to 9 km.

At the multiplexer 2, the incoming ATM data and ISDN data are multiplexed together and transmitted along the copper wire pair link 1 into the home in VDSL format using DMT. The ISDN is carried in spare bits in the framing byte downstream (FIG. 3), and in spare bits in the protocol bytes upstream, i.e. not in the data cells themselves.

At the network terminating equipment in the home, there are two outputs, namely, a link 6 which carries ATM into the home and could be connected to a TV set—top box, and could carry TV channels, even allowing for interactive viewing, and a link 7, which consists of 4 or more copper wires which connects to standard ISDN services such as fax machines, computer connections and, or course, to a telephone. The telephone at least could be incorporated in the same overall housing as the network terminating equipment 3. Because there are four or more wires carrying the ISDN signal, this time in "S" format, the signals on the wires are simpler in nature than the "U" signals passing between the exchange and the multiplexer and the network terminating equipment 3. "S" format is described in ITU Reference I.430 and "U" format is described in ETSI Reference ETS 300 012.

Figure 4:
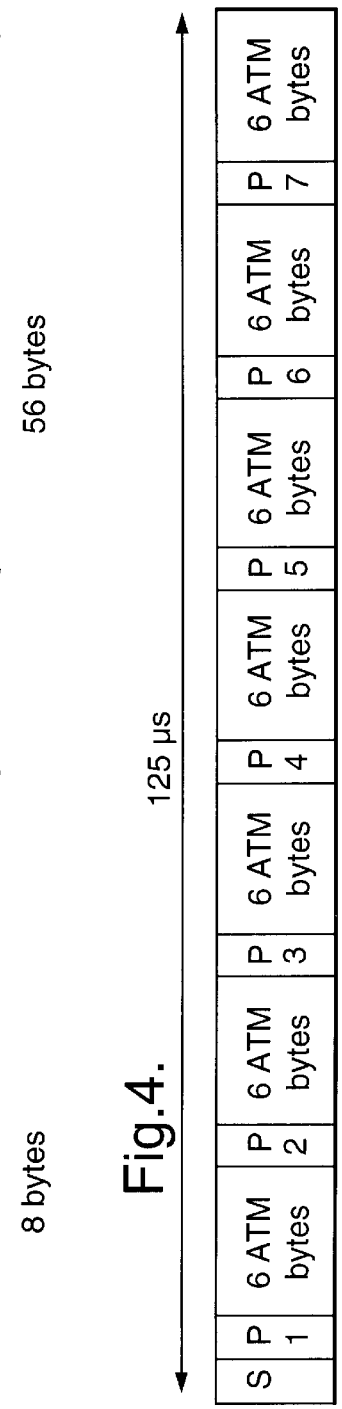
FIG. 4 illustrates a frame sent out by the network terminating equipment to the multiplexer.

Referring to FIGS. 3 and 4, the downstream data from the multiplexer to the home is clocked at 25.6 Mbit/sec, and the data is framed every 125 μs. Thus there are 400 bytes per frame. This allows 7 fixed size data packets or cells to be accommodated, leaving 8 bytes for framing, which includes the synchronization pattern.

Each cell contains an ATM (Asynchronous Transfer Mode) cell of 53 bytes, leaving 3 bytes per cell for forward error correction or cyclic redundancy check. These cells are in User Network Interface (UNI) format, described in ITU Recommendations I.150.

Referring to FIG. 4, the upstream data from the home to the multiplexer has data clocked at 3.2 Mbit/sec. This is also framed at 125 μs, giving 50 bytes per frame.

The cells sent downstream have a number in a repeating pattern. This number is acknowledged. Thus, in operation, the multiplexer steadily sends frames of the -type shown in FIG. 3 to the network terminating equipment, and successive cells are given a sequence number in an increasing sequence modulo-8. To take an example, suppose that Cell 1 has the first sequence number Cell 2 the second etc. Cell 7 will have the 7th sequence number and Cell 1 of the next frame the 8th sequence number. Cell 2 of the next frame will have the sequence number given to Cell 1 of the first frame.

When Cell 1 of the first frame is received by the network terminating equipment, an acknowledgement is sent in the next protocol byte P1–P7 of the upstream frame. For example, P3 could be the next protocol byte to be sent, and 3 bits of each of the protocol bytes are set aside for the acknowledgements. Thus, those 3 bits would signal that the last successful cell sent was Cell 1.

The round trip is about 10 μs, so that when this is received at the multiplexer 2, Cell 2 is in the process of being sent, each cell having a period of around 18 μs. Accordingly Cell 3 is sent after Cell 2 even if it turns out that Cell 2 is not received. The sequence number of Cell 2 is read by the network terminating equipment and an acknowledgement that that sequence number has been received is sent in the first three bits of protocol byte 4.

The network terminating equipment expects each cell received to have an increasing sequence number on a modulo-8 basis. If, for example, due to noise, Cell 3 is not received at the network terminating equipment, protocol byte 5 will not send an acknowledgement, and the multiplexer will simply restart the sequence at Cell 3, even though it would by this time already have sent Cell 4, which may even have been validly received.

Other noteworthy features are that the framing cell contains analogue telephony (POTS-Plain Old Telephone System) or ISDN B channels and that four spare bits in the header [A] -FIG. 3 are used to transmit ISDN D channel. The flow of ISDN in the other direction is contained in the protocol bytes of the upstream frame, as is analogue telephony. The ISDN thus does not suffer much from delay.

In the downstream direction (FIG. 3) the ATM data is carried in the cells. In the upstream direction (FIG. 4), 3 ATM cells of 56 bytes are spread over 4 upstream frames. The information as to where the next ATM cell starts is given in protocol byte 1.

A full acknowledgement with resends may be necessary under some noisy conditions. However, many errors may be of just one bit, so some error correction may be useful. An error correction of at least 2 bytes should be included in each cell, although 3 bytes would be preferable.

Given the cabling range the downstream data must use a send ahead protocol of at least one cell for range and a second cell to allow for delays through the VDSL processing. Upstream, a send ahead protocol would also be desirable, but could be perhaps avoided for a small loss of performance. (A send ahead protocol means that a certain number of cells, say, n are sent before receipt of the first is acknowledged. The second is acknowledged after n+1 cells have been sent etc. The data needs to be scrambled in a way which recovers quickly from errors. This could be the standard ATM scrambler of $1+x^{43}$. The scrambling and the error detection/correction need to be considered together.

Under degraded line conditions, the downstream data rate could drop back to lower data rates. For example, the downstream rate could drop to three quarters of full rate, i.e. 19.2 Mbit/sec, and there could be 5 cells to a frame or 21 cells to a multi-frame of 4 frames. If the data rate dropped to half, i.e. 12.8 Mbit/sec and there were 200 bytes per frame, then there could be 3 cells in a frame, 7 in a multi-frame of 2 frames or 99 in a multi-frame of 28 frames. If the data rate dropped back to a quarter, corresponding to 100 bytes per frame, there could be 1 cell per frame, 3 per multi-frame of 2 frames, 5 per multi-frame of 3 frames or 141 per multi-frame of 84 frames.

As an example, the allocation of bits in the protocol bytes of the upstream frame could be as follows:

| Protocol Byte | Bits | Meaning |
|---|---|---|
| P1 | 0–3 | Acknowledgement for downstream cells |
|    | 4–7 | Used to indicate frame of 4 to tell start of real ATM data. |
|    |     | = 0 frame 1, cell starts immediately following |
|    |     | = 1 frame 2, a cell starts in 14th data byte |
|    |     | = 2 frame 3, a cell starts in 28th data byte |
|    |     | = 3 frame 4, no cells start in frame |
| P2 | 0–3 | Acknowledgement for downstream cells |
|    | 4–7 | LSB of Pots channel 1 |
| P3 | 0–3 | Acknowledgement for downstream cells |
|    | 4–7 | MSB of Pots channel 1 |
| P4 | 0–3 | Acknowledgment for downstream cells |
|    | 4–7 | LSB of Pots channel 2 |
| P5 | 0–3 | Acknowledgement for downstream cells |
|    | 4–7 | MSB of Pots channel 2 |
| P6 | 0–3 | Acknowledgement for downstream cells |
|    | 4–7 | D channel ISDN |
| P7 | 0–3 | Acknowledgement for downstream cells |
|    | 4–7 | Spare |

In FIG. 4, S is the framing byte, which includes a synchronization pattern.

As far as the upstream formats are concerned, an alternative of a higher data rate of 6.4 Mbit/sec is possible. There would have to be more than one protocol in the downstream frame to control it. There would be 100 bytes to use, and there could be 7 acknowledgements for the downstream data spread over each frame. It should be possible to squeeze the POTS, these acknowledgements and some framing into say 8 bytes leaving 92 for data. Allowing for a cell format the same as for the downstream and same check field this fits exactly 23 cells in 14 frames. Or in simpler mappings, 3 cells in 2 frames or 8 in 5 frames.

The downstream protocol must handle a 1 (or 2) cell send ahead to keep the data rate up. A sophisticated selective retry mechanism would reduce the effect of errors but at a heavy protocol overhead, therefore a simple rewind back to a faulty cell method was chosen. With only a one cell ahead window, a small sequence number is required, 4 values being more than adequate, but provision must be made for the protocol to be reset to a fifth (empty value).

To achieve a 2 cell window, an 8 value sequence was chosen. A suitable set of sequence number values is as follows:

| Sequence Number Value | Interpretation data | Interpretation in acknowledgements |
|---|---|---|
| 0000 | No Cell | Sequence Reset |
| 0001 | Reset | Reset Request |
| 0100 | Cell with sequence 0 | Last successful cell was seq #0 |
| 0101 | Cell with sequence 1 | Last successful cell was seq #1 |
| 0110 | Cell with sequence 2 | Last successful cell was seq #2 |
| 0111 | Cell with sequence 3 | Last successful cell was seq #3 |
| 1100 | Cell with sequence 4 | Last successful cell was seq #4 |
| 1101 | Cell with sequence 5 | Last successful cell was seq #5 |
| 1110 | Cell with sequence 6 | Last successful cell was seq #6 |
| 1111 | Cell with sequence 7 | Last successful cell was seq #7 |
| Others (001x) | Reserved | Reserved |

If the network terminating equipment gets reset, it sends a special "reset request" value as its last successful cell. If the multiplexer sees this value, it sends "reset" to the network terminating equipment. When the network terminating equipment gets this it responds "sequence reset", after which the multiplexer can send cell sequence #0 again. If the multiplexer suspects confusion it can send "reset" to the network terminating equipment itself This ensures that the sequence works again after failure.

The above discussion has referred to the protocol for sending cells from the multiplexer to the network terminating equipment. The protocol for sending from the network terminating equipment to the multiplexer would be the same.

Figure 5:
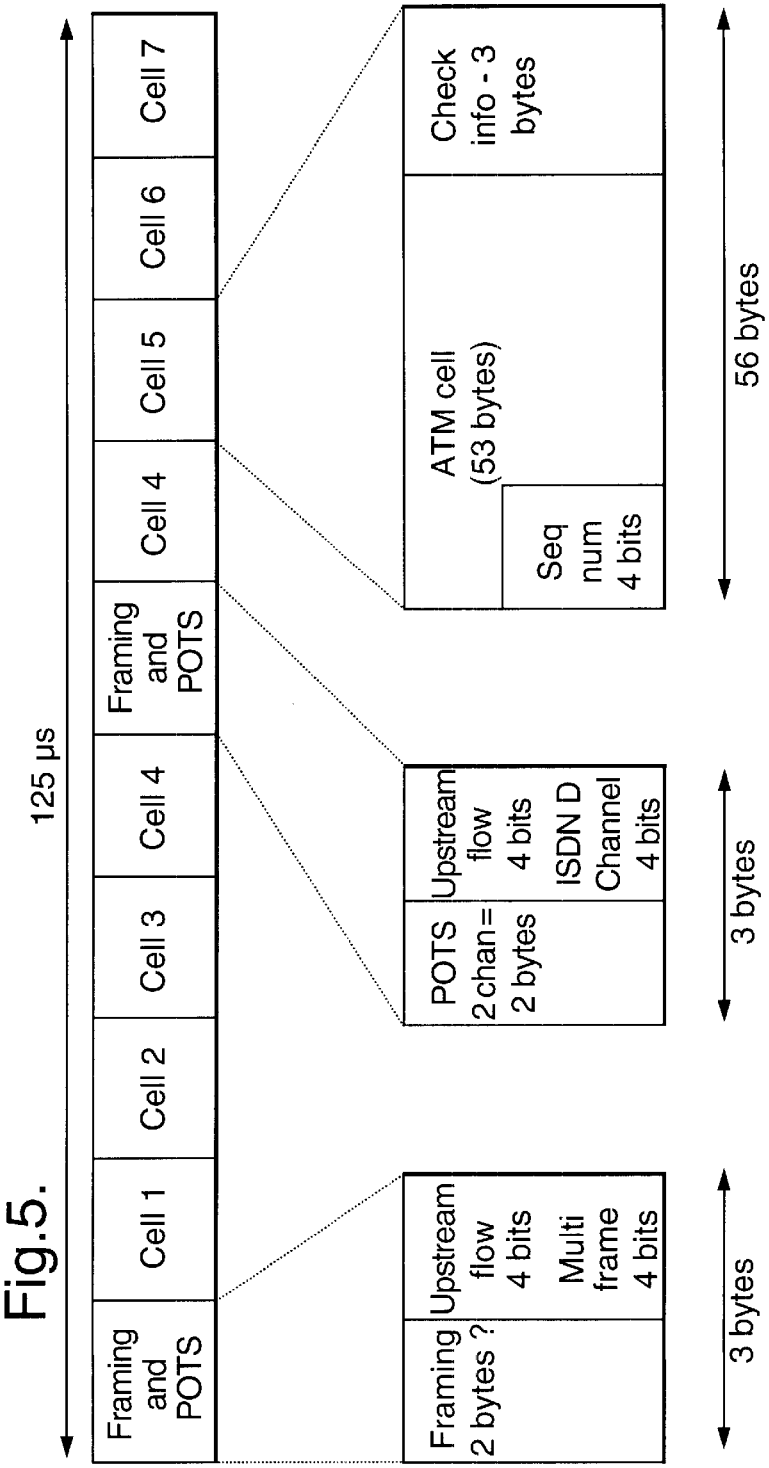
FIG. 5 illustrates a frame at an alternative data rate sent from the multiplexer to the network terminating equipment.
Figure 6:
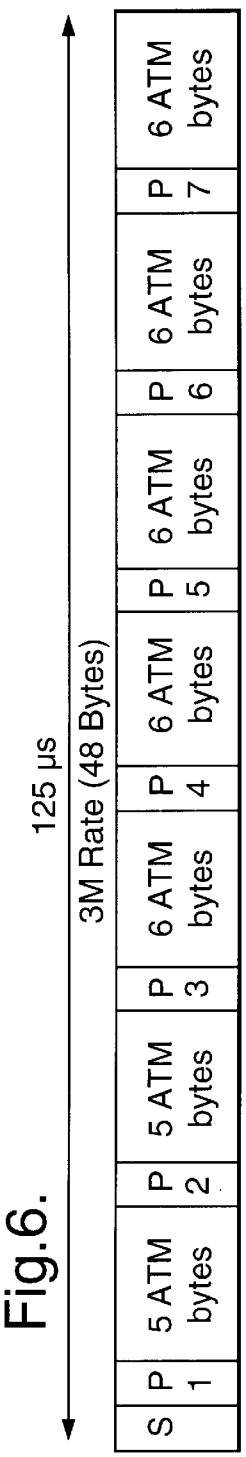
FIG. 6 shows a frame at an alternative data rate sent from the network terminating equipment to the multiplexer.

Referring to FIGS. 5 and 6, an alternative frame based on 24.576 Mbit/sec upstream and 3.072 Mbit/sec downstream is shown. This alternative frame is based on a standard telecoms data rate as 24.576 Mbit/sec is exactly 12 times 2.048 Mbit/sec commonly used in telecoms. Drop-back of the downstream rate to 18.432 Mbit/sec or 12.280 Mbit/sec would be possible and the upstream rate could be increased to 6.144 Mbit/sec.

The framing can either be in the header as shown, or could be split with 1 byte in each place and 1 telephony channel in each place. FIG. 5 shows telephony and ISDN in the second framing field. The multi-framing points forward to the start of the next cell, and is a common format for 12/18/24 Mbit/sec downstream.

At 24.576 Mbit/sec, the sequence will fit exactly 27 cells over 4 frames (22.876 Mbit/sec of ATM. At 18.432 Mbit/sec there are two options, either fully utilise with 141 cells over 28 frames (17.08 Mbit/sec of ATM) or just have exactly 5 cells per frame and waste 2 bytes per frame. At 12.288 Mbit/sec the sequence can be to fully utilize 93 cells over 28 frames (11.14 Mbit/sec of ATM, or to do some form of partial fill).

The multi-frame needs to indicate 28 different values for the lower data rates. This cannot be achieved in a 4 bit field. There are two alternatives, one is to use part of another field, the other is to only indicate this information every other frame (14 values) and have a continuation indicator in the other frames. The proposal assumes that at 12/18 Mbit/sec the alternate frame marking is used. The proposal is the following:

| Value | Distance to cell start (bytes) on a 24M Link | Distance to cell start on a 18M Link | Distance to cell start on a 12M Link |
|---|---|---|---|
| 0 | 0 | 0 | 0 |
| 1 | 14 | 4 | 4 |
| 2 | 28 | 8 | 8 |
| 3 | 42 | 12 | 12 |
| 4 | Not Used | 16 | 16 |
| 5 | Not Used | 20 | 20 |
| 6 | Not Used | 24 | 24 |
| 7 | Not Used | 28 | 28 |
| 8 | Not Used | 32 | 32 |
| 9 | Not Used | 36 | 36 |
| 10 | Not Used | 40 | 40 |
| 11 | Not Used | 44 | 44 |
| 12 | Not Used | 48 | 48 |
| 13 | Not Used | 52 | 52 |
| 14 | Not Used |   |   |
| 15 | Not Used | Last +2 | (Last +20) Mod 56 |

For a 24 Mbit/sec link this will cycle 0, 1, 2, 3, 0, 1, 2, 3 . . .

For an 18 Mbit/sec link this will cycle 0, 15, 1, 15, 2, 15, 3, 15, 4, 15, 5, 15, 6, 15, 7, 15, 8, 15, 9, 15, 10, 15, 11, 15, 12, 15, 13, 15, 0 . . .

For a 12 Mbit/sec link this will cycle 0, 15, 5, 15, 10, 15, 1, 15, 6, 15, 11, 15, 2, 15, 7, 15, 12,15,3, 15, 8, 15, 13, 15, 4, 15, 9, 15, 0 . . .

There are 48 or 96 bytes to use upstream, and there should be 7 acknowledgments for the downstream data spread over the frame. It should be possible to accommodate the POTS, these acknowledgements and some framing into say 8 bytes leaving 40 or 88 for data. The cells should fill the resultant pay-load which is a 7 frame sequence carrying 5 cells at 3.072 Mbit/sec (2.42 Mbit/sec of ATM, or at 6 Mbit/sec) (not shown) it will carry 11 cells in a 7 frame sequence (5.56 Mbit/sec of ATM).

In FIG. 6, S refers to the synchronization/framing byte, P1–7 indicate protocol bytes, elaborated below and ATM bytes carry ATM cell and check information.

The synchronization byte gives a pattern that the multiplexer can latch onto to receive the data.

The protocol bytes are as shown below:

| Protocol Byte | Bits | Value | Meaning |
|---|---|---|---|
| P1 | 0–3 | | Acknowledgement for downstream cells |
| | 4–7 | | Used to indicate frame of 7 to tell start of real ATM data. |
| | | =0 | frame 1 at 3M, cell starts immediately following |
| | | =1 | frame 2 at 3M, a cell starts in 16th data byte |
| | | =2 | frame 3 at 3M, a cell starts in 32nd data byte |
| | | =3 | frame 4 at 3M, no cell starts in frame |
| | | =4 | frame 5 at 3M, a cell starts in 8th data byte |
| | | =5 | frame 6 at 3M, a cell starts in 24th data byte |
| | | =6 | frame 7 at 3M, no cell starts in frame |
| | | =8 | frame 1 at 6M, a cell starts immediately following (&56) |
| | | =9 | frame 2 at 6M, a cell starts in 24th data byte (&80) |
| | | =10 | frame 3 at 6M, a cell starts in 48th data byte |
| | | =11 | frame 4 at 6M, a cell starts in 16th data byte (&72) |
| | | =12 | frame 5 at 6M, a cell starts in 40th data byte |
| | | =13 | frame 6 at 6M, a cell starts in 8th data byte (&64) |
| | | =14 | frame 7 at 6M, a cell starts in 32nd data byte |
| P2 | 0–3 | | Acknowledgement for downsteam cells |
| | 4–7 | | LSB of Pots channel 1 |
| P3 | 0–3 | | Acknowledgement for downstream cells |
| | 4–7 | | MSB of Pots channel 1 |
| P4 | 0–3 | | Acknowledgement for downstream cells |
| | 4–7 | | LSB of Pots channel 2 |
| P5 | 0–3 | | Acknowledgement for downstream cells |
| | 4–7 | | MSB of Pots channel 2 |
| P6 | 0–3 | | Acknowledgement for downstream cells |
| | 4–7 | | Spare of D channel if wanted for ISDN |
| P7 | 0–3 | | Acknowledgement for downstream cells |
| | 4–7 | | Spare |

I claim:

1. A method of delivering both higher and lower data rate services from a communications network along a communications link to a user terminal, comprising the steps of:
   a) transmitting a higher data rate signal representing the higher data rate service along the link within frames, each frame having a plurality of fixed size data cells for containing the higher data rate signal, and at least one framing field for containing framing information; and
   b) transmitting a lower data rate signal representing the lower data rate service along the link within said at least one framing field to enable both the higher and lower data rate signals to be transmitted to the terminal.

2. The method of claim 1, wherein the higher data rate signal is an asynchronous transfer mode (ATM) signal.

3. The method of claim 1, wherein the lower data rate signal is an integrated services digital network (ISDN) signal.

4. The method of claim 1, wherein the framing information within said at least one framing field includes a synchronization pattern.

5. The method of claim 1, wherein each cell includes a number field containing a number which changes from one of the cells to another of the cells in a regularly repeating sequence, and the step of acknowledging receipt of the number of each cell.

6. The method of claim 5, wherein the number increments to n in a modulo-n sequence.

7. The method of claim 5, and further comprising, in the event of lack of acknowledgment of the receipt of the number of a respective cell, the step of restarting the sequence at the number of the respective cell.

8. The method of claim 1, wherein said at least one framing field has spare bits in which said framing information is accommodated.

9. A multiplexer for delivering both higher and lower data rate services from a communications network along a communications link to a user terminal, comprising:
   a) means for transmitting a higher data rate signal representing the higher data rate service along the link within frames, each frame having a plurality of fixed size data cells for containing the higher data rate signal, and at least one framing field for containing framing information; and
   b) means for transmitting a lower data rate signal representing the lower data rate service along the link within said at least one framing field to enable both the higher and lower data rate signals to be transmitted to the terminal.

10. The multiplexer of claim 9, wherein the higher data rate signal is an asynchronous transfer mode (ATM) signal.

11. The multiplexer of claim 9, wherein the lower data rate signal is an integrated services digital network (ISDN) signal.

12. The multiplexer of claim 9, wherein the framing information within said at least one framing field includes a synchronization pattern.

13. The multiplexer of claim 9, wherein each cell includes a number field containing a number which changes from one of the cells to another of the cells in a regularly repeating sequence, and means for acknowledging receipt of the number of each cell.

14. The multiplexer of claim 13, wherein the number increments to n in a modulo-n sequence.

15. The multiplexer of claim 13, and further comprising, in the event oflack of acknowledgment of the receipt of the number of a respective cell, means for restarting the sequence at the number of the respective cell.

16. The multiplexer of claim 9, wherein said at least one framing field has spare bits in which said framing information is accommodated.

17. A network terminating equipment for receiving both higher and lower data rate services from a communications network along a communications link, comprising:
   a) means for receiving a higher data rate signal representing the higher data rate service along the link within frames, each frame having a plurality of fixed size data cells for containing the higher data rate signal, and at least one framing field for containing framing information; and
   b) means for receiving a lower data rate signal representing the lower data rate service along the link within said at least one framing field to enable both the higher and lower data rate signals to be received at the equipment.

18. The equipment of claim 17, wherein the higher data rate signal is an asynchronous transfer mode (ATM) signal.

19. The equipment of claim 17, wherein the lower data rate signal is an integrated services digital network (ISDN) signal.

20. The equipment of claim 17, wherein the framing information within said at least one framing field includes a synchronization pattern.

21. The equipment of claim 17, wherein each cell includes a number field containing a number which changes from one of the cells to another of the cells in a regularly repeating sequence, and means for acknowledging receipt of the number of each cell.

22. The equipment of claim 21, wherein the number increments to n in a modulo-n sequence.

23. The equipment of claim 21, and further comprising, in the event of lack of acknowledgment of the receipt of the number of a respective cell, means for restarting the sequence at the number of the respective cell.

24. The equipment of claim 17, wherein said at least one framing field has spare bits in which said framing information is accommodated.

* * * * *